United States Patent [19]

Ohsumi et al.

[11] 4,293,382
[45] Oct. 6, 1981

[54] METHOD OF STARTING UP A NUCLEAR REACTOR

[75] Inventors: Katsumi Ohsumi; Minoru Miki, both of Hitachi, Japan

[73] Assignee: Hitachi, Ltd., Tokyo, Japan

[21] Appl. No.: 937,863

[22] Filed: Aug. 29, 1978

[30] Foreign Application Priority Data

Sep. 2, 1977 [JP] Japan .................. 52-106149

[51] Int. Cl.³ ............................................. G21C 19/32
[52] U.S. Cl. .................................................. 376/308
[58] Field of Search .................... 176/37, 38, 39, 55

[56] References Cited

U.S. PATENT DOCUMENTS

| 3,028,327 | 4/1962 | Weeks | 176/39 |
| 3,041,134 | 6/1962 | Weeks | 176/37 |
| 3,068,164 | 12/1962 | Coles et al. | 176/39 |
| 3,663,725 | 5/1972 | Pearl | 176/55 |

FOREIGN PATENT DOCUMENTS

| 2013679 | 10/1970 | Fed. Rep. of Germany | 176/37 |
| 2621598 | 11/1976 | Fed. Rep. of Germany | 176/37 |
| 2536874 | 2/1977 | Fed. Rep. of Germany | 176/37 |
| 5285696 | 1/1976 | Japan | 176/38 |
| 5122994 | 2/1976 | Japan | 176/38 |

Primary Examiner—S. A. Cangialosi
Attorney, Agent, or Firm—Craig and Antonelli

[57] ABSTRACT

At the time of starting up a nuclear reactor, the concentration of oxidizing substance in a cooling water in a reactor pressure vessel is decreased by evacuating the pressure vessel or replacing air in the vessel with an inert gas for a long time, below a predetermined level before the cooling water is heated to a temperature of 150° C., thereby preventing the occurrence of stress corrosion cracking.

14 Claims, 8 Drawing Figures

METHOD OF STARTING UP A NUCLEAR REACTOR

BACKGROUND OF THE INVENTION

The present invention relates to a method of starting up a water-cooled nuclear reactor, and more particularly to a method of starting up a boiling water reactor.

In a power plant including a water-cooled nuclear reactor, particularly, a boiling water reactor, it has been known that the concentrations of the oxidating substances, such as oxygen and hydrogen peroxide, in a cooling water exert a considerable influence on the corrosion of the carbon steel pipeline connecting the pressure vessel of the reactor to the turbine and the condenser. In this connection, it has been proposed to control the concentration of oxygen in the water passed through the pipeline. For example, U.S. Pat. No. 3,663,725 to Wesley L. Pearl discloses such a technique that oxygen is put into the boiler feedwater to control the concentration of oxygen in the feedwater. Japanese Patent Kokai (Laid-Open) Publication No. 22994/76 to Katsumi OHSUMI discloses a technique in which drain in a feedwater heater is fed into water to be returned to the reactor pressure vessel from a condenser to control the concentration of oxygen dissolved in the water. Japanese Patent Kokai (Laid-Open) Publication No. 85696/77 to Kozo DOMON et al discloses a technique of controlling concentration of oxygen dissolved in water in a pipeline connecting condenser and a reactor pressure vessel, prior to the start of a nuclear reactor. However, heretofore, no consideration has been given to the concentration of oxygen in a cooling water retained in a pressure vessel of a nuclear reactor.

When a boiling water reactor is in operation, oxygen concentration in a cooling water or a reactor water in the pressure vessel is kept as low as 0.2 ppm. However, after the reactor is shut-down and opened to the atmosphere, oxygen in the open air is dissolved into the cooling water so that the oxygen concentration in the cooling water will increase to a saturation value, of about 7-8 ppm. Heretofore, the operation of the reactor has been started in this state and the cooling water is heated by nuclear reaction to a high level before the oxygen concentration in the cooling water is satisfactorily decreased. The cooling water with high temperature and high oxygen concentration tends to cause corrosions in core materials and/or in cooling water recirculation systems. Particularly, in case where austenite stainless steel is used in the core materials or in the cooling water recirculation systems, the austenite stainless steel tends to suffer from stress corrosion cracking.

Further, at the time of the start of nuclear reaction in the reactor, hydrogen peroxide is generated due to radioactive decomposition of water. As a result, the concentrations of oxygen and hydrogen peroxide are temporarily increased in the reactor water, thereby further deteriorating the corrosive environment.

SUMMARY OF THE INVENTION

Accordingly, one object of the present invention is to provide a method of starting up a nuclear reactor, capable of preventing corrosions in a pressure vessel of the nuclear reactor and a cooling water recirculation system.

Another object of the present invention is to provide a method of starting up a nuclear reactor, capable of preventing stress corrosion cracking in a pressure vessel of the nuclear reactor and a cooling water recirculation system.

To achieve the above-described objects, the method according to the present invention includes, at the time of start of a nuclear reactor, a step of decreasing the concentrations of the oxidizing substances in cooling water in a pressure vessel below a predetermined level, before the temperature of the cooling water heated by nuclear reaction reaches 150° C. The predetermined level for the concentration is preferably selected at about 0.5 ppm of the concentration of oxygen. In general, stress corrosion cracking tends to occur when the temperature and the concentration of oxygen are high. However, almost no stress corrosion cracking occurs at a temperature less than 150° C. irrespective of the concentration of oxygen. Consequently, the occurrence of stress corrosion cracking can be prevented by decreasing the concentration of oxygen before the temperature of the cooling water reaches 150° C.

DETAILED DESCRIPTION OF THE PREFERRED EMBODIMENTS

Figure 3:
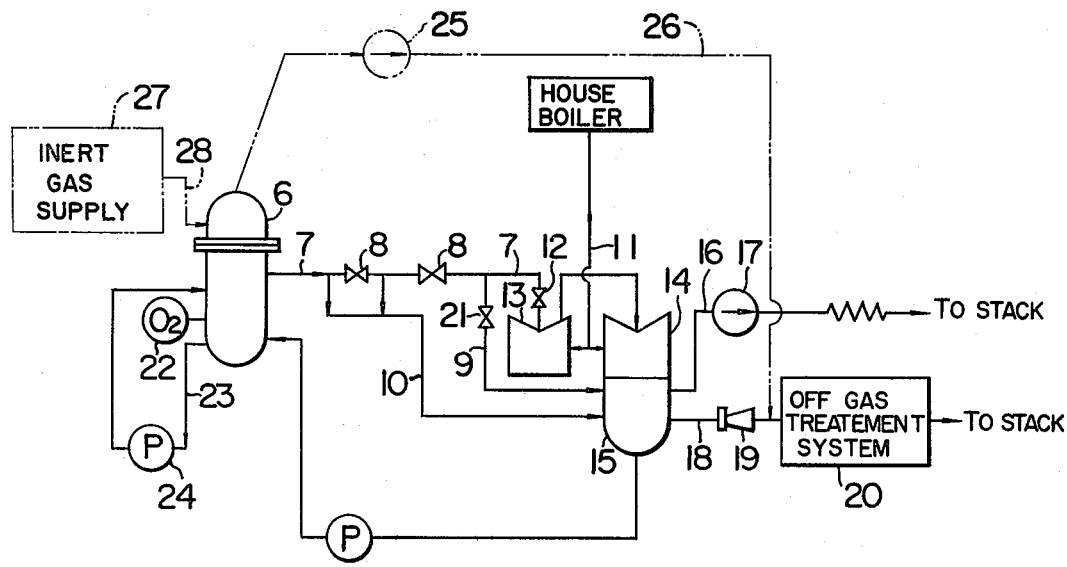
FIG. 3 is a schematic view of a power plant including a boiling water reactor.

FIG. 3 is a general view of an electric power plant including a boiling water reactor. The power plant includes a pressure vessel 6 of a reactor, a main steam line 7, a main steam isolation valve 8, a turbine bypass line 9, a main steam drain line 10, a gland seal steam supply line 11, a main stop valve 12, a high pressure turbine 13, a low pressure turbine 14, a condenser 15, an air extraction line 16, a condenser mechanical vacuum pump 17, an off gas line 18, an air ejector 19, an off gas treatment system 20, a turbine bypass valve 21, an $O_2$ sensor 22, a cooling water recirculation line 23, and a recirculating pump 24. All of the above-described parts, except for the dissolved $O_2$ sensor, belong to an ordinary conventional power plant.

Figure 1:
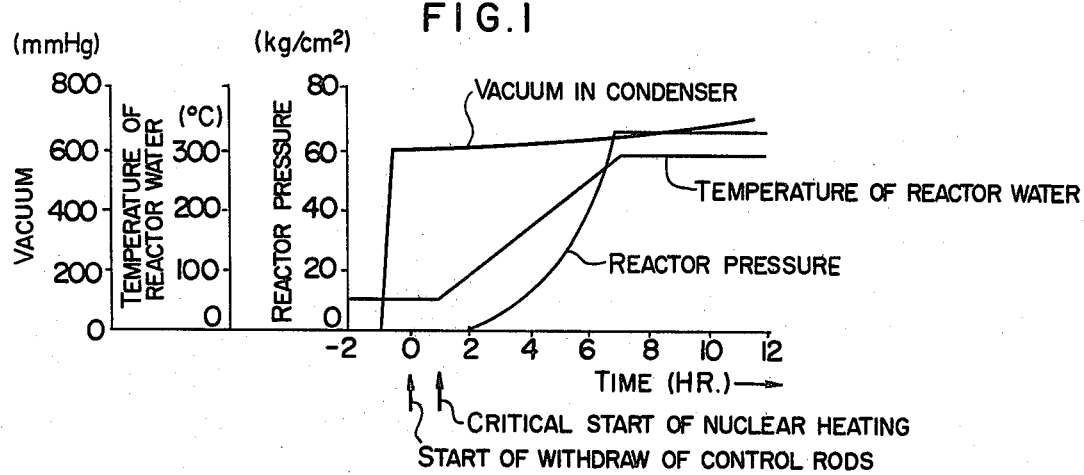
FIG. 1 is a characteristic diagram showing the changes in temperature of a cooling water in a reactor pressure vessel, pressure in the pressure vessel and vacuum in a condenser during the time of starting-up a boiling water reactor by a conventional method.
Figure 2:
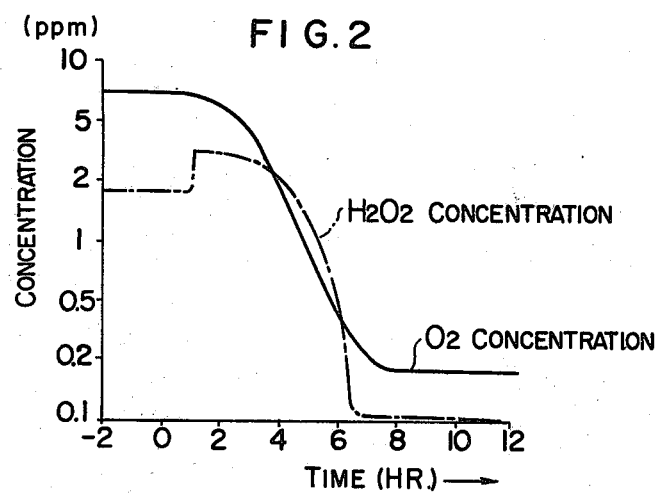
FIG. 2 is a characteristic diagram showing the changes in the concentrations of oxygen and hydrogen peroxide in the cooling water, during the time of starting-up the boiling water reactor by the conventional method.

Description will hereunder be given of the conventional method of starting up the power plant, prior to describing the method of starting the power plant according to the present invention. According to the conventional starting method, firstly, steam from a boiler other than the reactor begins to be fed to gland seal portions of both the high pressure turbine 13 and the low pressure turbine 14 via the gland seal steam supply line 11 to seal the portions and then the condenser vacuum pump 17 starts its operation to evacuate the condenser 15. After the condenser 15 has reached a desired degree of vacuum, a valve on the main steam drain line 10 is opened whereby the pressure vessel 6 of the reactor is communicated with the condenser 15, to remove the remaining air from the pressure vessel 6. After the remaining air is removed or the pressure vessel 6 is sufficiently evacuated, withdrawal of control rods is started immediately. After the reactor attains criticality, the control rods are further withdrawn to increase the temperature and pressure of the reactor to the rated temperature and pressure. FIG. 1 shows the reactor water temperature, pressure and the vacuum in the condenser at the time of starting. FIG. 2 shows the concentrations of oxygen and hydrogen peroxide in the reactor water. As apparent from FIGS. 1 and 2, the concentrations of oxygen and hydrogen peroxide in the reactor water gradually decreases to finally reach very low levels. However, while the temperature of the reactor water is being elevated, the concentrations still stay at high levels. Particularly, even after the temperature of the core water exceeds 200° C., the concentrations of oxygen and hydrogen peroxide in the reactor water stay still high, and hence, there is high possibility of susceptibly causing stress corrosion cracking to the interior of the reactor, the pipelines and components disposed therearound.

Further, as clearly shown in FIG. 2 the concentration of hydrogen peroxide is sharply increased at a time about one hour after from the start of withdraw of the control rods. This is because additional hydrogen peroxide is generated by the radioactive decomposition of water and dissolved into the reactor water. At this time, the concentration of oxygen increases with the increase of hydrogen peroxide in amount. However, the concentration of oxygen is large in absolute value, and hence, the resultant effect does not appear in FIG. 2.

Figure 4:
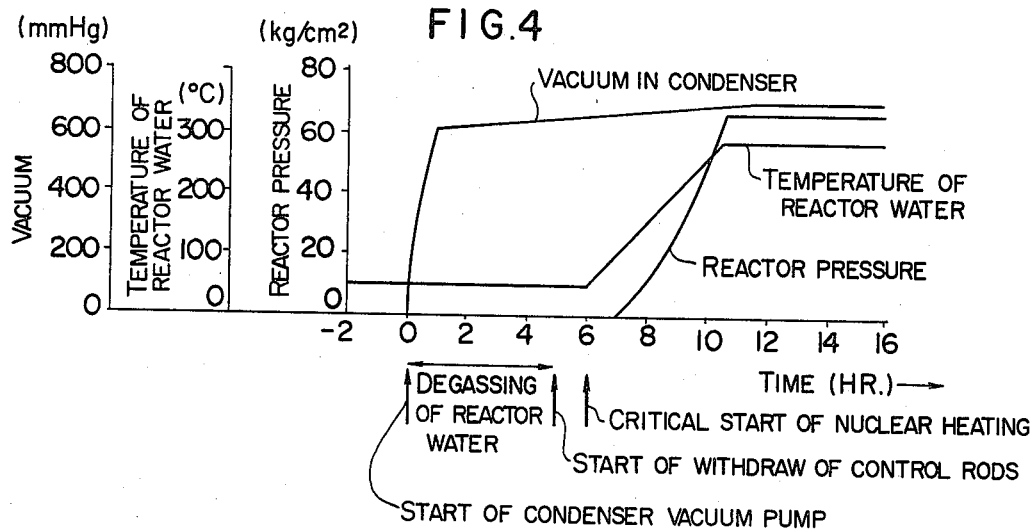
FIG. 4 is a characteristic diagram similar to that of FIG. 1, during the time of starting up the boiling water reactor by an embodiment of the invention.
Figure 5:
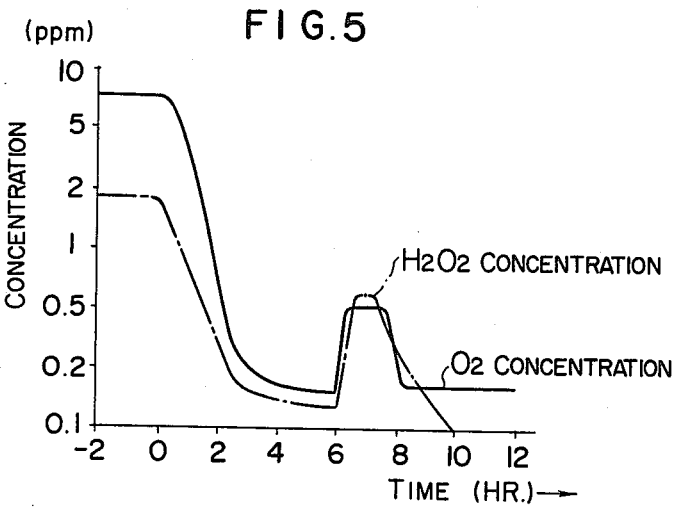
FIG. 5 is a characteristic diagram similar to that of FIG. 2, during the time of starting up the boiling water reactor by the embodiment.

Description will hereunder be given of a method of starting the nuclear reactor, embodying the present invention with reference to FIGS. 3, 4 and 5. Similarly to the conventional method, the vacuum pump 17 operates to evacuate the condenser 15. When the condenser reaches a given degree of vacuum, the valve of the main steam drain line 10 is opened, whereby the pressure vessel 6 is communicated with the condenser 15. Thus, the vessel 6 is evaluated through the condenser 15. Even after the vessel is evacuated, the vacuum pump 17 is kept running for a long time to keep the interior of the vessel 6 vacuum so that the reactor water is degased. At this time, the main steam isolation valve 8 and the turbine bypass valve 21 also may be opened, to communicate the condenser 15 to the pressure vessel 6 with less flow resistance. The reactor water is continuously degased for about five hours, whereby the concentration of oxygen in the reactor water decreases, thus reaching substantially steady-state value (approx. 0.2 ppm). The concentration of oxygen in the reactor water is measured by the dissolved oxygen concentration meter 22. The concentration of oxygen may be measured by the grab sampling of the reactor water. When the concentration of oxygen in the reactor water reaches the above mentioned steady-state value, withdrawal of the control rods is begun. Thereafter the same procedure as that of the conventional starting up method is followed.

According to this method, nuclear reaction is started after the concentration of oxygen is satisfactorily decreased, and hence, when the temperature of the reactor water becomes high, the concentration of oxygen is very low, thus enabling to prevent stress corrosion cracking. Referring to FIG. 5, the concentrations of oxygen and hydrogen peroxide become temporarily high in six hours after the starting of the vacuum pump. This is caused by the withdrawal of the control rods. When the reactor attains critical condition and starts nuclear heating, the reactor water remains at a low temperature such as 50° C., as yet, and hence, hydrogen peroxide produced due to radioactive decomposition of the reactor water caused by increased neutron flux at the time of starting nuclear heating is dissolved into the reactor water. This increase in the concentration, however, is comparatively low, thus resulting in little influence given to the occurrence of stress corrosion cracking.

As has been described above, stress corrosion cracking tends to occur at high water temperature when the concentration of oxygen is high. In other words, almost no stress corrosion cracking occurs at the water temperature less than 150° C. irrespective of the concentration of oxygen. Consequently, it should be noted that the concentration of oxygen in the reactor water be decreased to a given value before the temperature of the reactor water reaches 150° C., preferably, before the reactor attains criticality. It is preferable to decrease the concentration of oxygen as low as possible by degassing the reactor water, and it may be sufficient to decrease it below 0.5 ppm, and preferably below 0.2 ppm.

Figure 6:
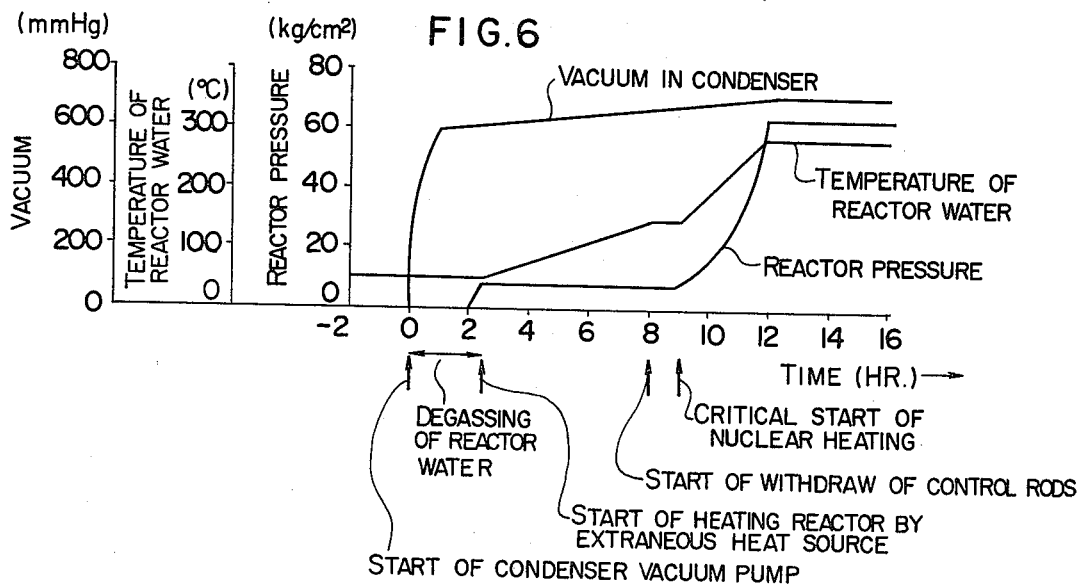
FIG. 6 is a characteristic diagram similar to that of FIG. 4, but in accordance with another embodiment of the present invention.
Figure 7:
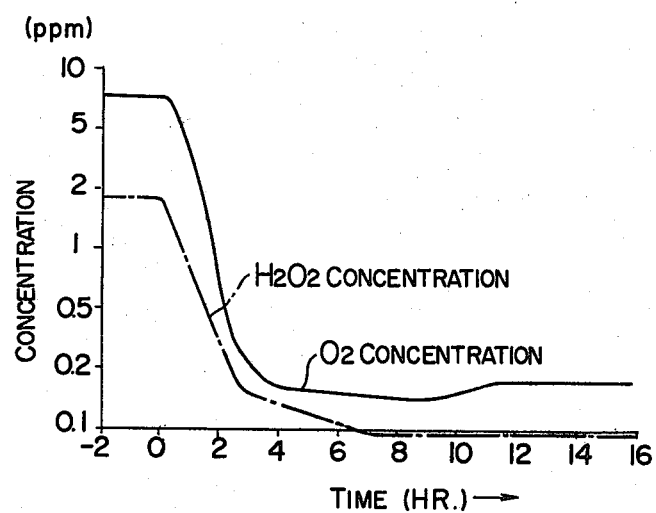
FIG. 7 is a characteristic diagram similar to that of FIG. 5 but in accordance with the other embodiment of the present invention.
Figure 8:
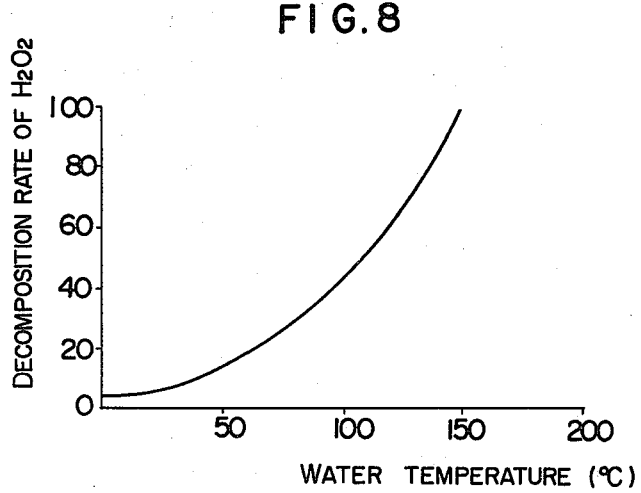
FIG. 8 is a characteristic diagram showing the relationship between the temperature of water and the decomposition rate of hydrogen peroxide.

FIGS. 6 and 7 show the characteristics of another example of the present invention. As shown in FIGS. 4 and 5, when the reactor attains criticality at about a low temperature of 50° C., the concentrations of oxygen and hydrogen peroxide become temporarily high. The present example is intended to prevent the above-described phenomenon. In the present example, similarly to the previous example, the pressure vessel 6 is evacuated by the vacuum pump 17 via the condenser 15, and the reactor water is degased. The degassing is continued for about two hours so that the concentrations of oxygen and hydrogen peroxide in the core water are decreased. Thereafter, heating of the reactor water is started. This heating is effected by use of an extraneous heat source other than nuclear heating. For example, pumps capable of directly circulating the reactor water such as the reactor recirculating pump 24 or pumps in a residual heat removal system (not shown) are operated to heat the reactor water by the utilization of heat generated by the driving of the pumps. The reactor water may be directly or indirectly heated by use of the boiler steam in the power plant. When the temperature of the reactor water is elevated to about 150° C., nuclear heating is started. According to the method of starting up the reactor as described above, rapid increases of concentrations of oxygen and hydrogen peroxide which would occur at the beginning of nuclear heating are prevented as shown in FIG. 7. The reason is that, though hydrogen peroxide is produced when nuclear heating is started, it has been immediately decomposed. FIG. 8 indicates the general relationship between the decomposition of hydrogen peroxide in the water and the temperature. The decomposition rate of hydrogen peroxide varies depending upon the concentration of hydrogen peroxide, impurities, contact materials and the like, and it is known that hydrogen peroxide is decomposed instantly at a temperature of about 150° C.

In the above-described example, the reactor water is heated by the extraneous heat source to 150° C., and thereafter, nuclear heating is started. However, the characteristics shown in FIG. 7 can be attained by that the reactor water is heated to 100° C., thereafter, nuclear heating is started, and the reactor water is constantly kept in boiling state. Since almost no hydrogen peroxide can exist in the water in boiling conditions, hydrogen peroxide is discharged from the reactor water immediately after produced.

In the above-described examples, in order to decrease the concentration of oxygen in the reactor water, the condenser has been used to evacuate the pressure vessel 6 to degas the reactor water. However, it should be noted that, in order to degas the reactor water, any method other than the above is adoptable. For example, as shown in FIG. 3, the interior of the pressure vessel 6 may be evacuated by directly connecting the pressure vessel 6 to a vacuum pump 25 through a pipeline 26. Further, it is possible to decrease the concentration of oxygen in the reactor water by replacing air in the pressure vessel with an inert gas fed from an inert gas supply source 27 via a line 28, instead of keeping the interior of the pressure vessel 6, in vacuum.

What is claimed is:

1. A method of starting-up a nuclear reactor having a reactor pressure vessel conaining cooling water therein having an oxygen content greater than 5 ppm and a fission mass in a non-critical condition comprising the steps of reducing the oxygen concentration in the cooling water of the reactor pressure vessel to a concentration less than 0.5 ppm, causing the fission mass of the nuclear reactor to become critical, and raising the water temperature to at least 150° C.

2. A method as set forth in claim 1, wherein said step of reducing the oxygen concentration includes a step of evacuating the interior of the pressure vessel.

3. A method as set forth in claim 1, wherein said step of reducing the oxygen concentration includes a step of replacing air in the pressure vessel with an inert gas.

4. A method as set forth in claim 1, wherein the oxygen concentration is reduced to about 0.2 ppm.

5. A method as set forth in claim 1, the step of raising the water temperature to at least 150° C. is partially effected prior to causing the fission mass to become critical.

6. A method as set forth in claim 5, wherein the step of raising the water temperature to at least 150° C. is effected prior to causing the fission mass to become critical.

7. A method as set forth in claim 1, wherein the step of causing the fission mass to become critical is effected prior to raising the water temperature to at least 150° C.

8. A method as set forth in one of claims 2, 3 or 1, further comprising the step of heating the cooling water in the pressure vessel to a predetermined value before the start of nuclear reaction in the nuclear reactor.

9. A method as set forth in claim 1, wherein the nuclear reactor is a boiling-water nuclear reactor of an electric power plant with a turbine connected to the nuclear reactor to be driven by steam generated in the reactor and with a condenser connected to the turbine, and starting up the electric power plant by starting up the nuclear reactor.

10. A method as set forth in claim 9, wherein said step of reducing the oxygen concentration includes a step of evacuating the pressure vessel of the nuclear reactor by communicating the pressure vessel with the condenser being kept in vacuum.

11. A method as set forth in claim 9, wherein said step of reducing the oxygen concentration includes a step of replacing air in the pressure vessel with an inert gas.

12. A method as set forth in claim 9, further including a step of heating the cooling wqter in the pressure vessel to a predetermined value of temperature before the start of nuclear reaction.

13. A method as set forth in claim 12, wherein said heating of the cooling water is effected by the circulation of the cooling water in the pressure vessel by a pump.

14. A method as set forth in claim 9, wherein the oxygen is reduced to about 0.2 ppm.

* * * * *